Sept. 4, 1951 L. F. MITCHELL 2,566,738
PUNCHING APPARATUS
Filed May 3, 1949 3 Sheets-Sheet 1

*INVENTOR.*
LESTER F. MITCHELL
BY *Wallace and Cannon*

ATTORNEYS

*INVENTOR.*
LESTER F. MITCHELL

Sept. 4, 1951  L. F. MITCHELL  2,566,738
PUNCHING APPARATUS
Filed May 3, 1949  3 Sheets-Sheet 3
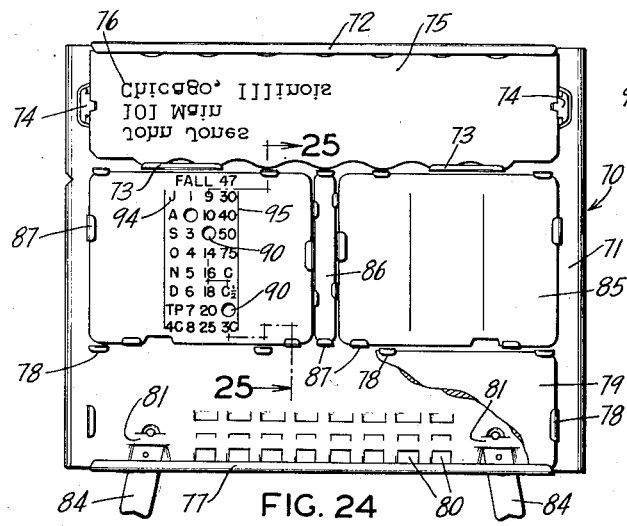
FIG. 24
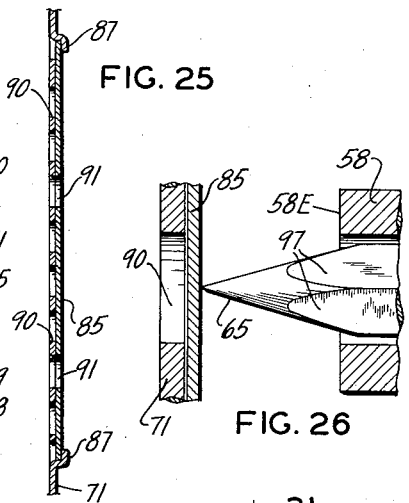
FIG. 25
FIG. 26
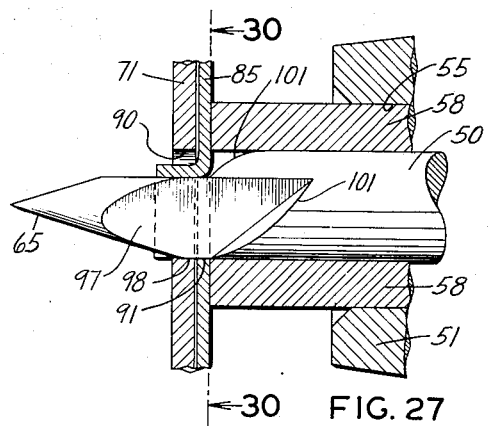
FIG. 27
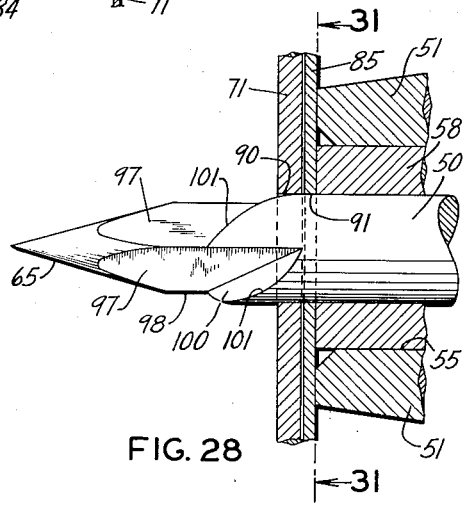
FIG. 28
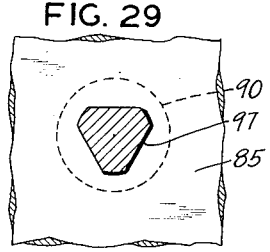
FIG. 29
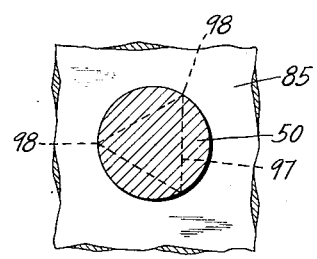
FIG. 31
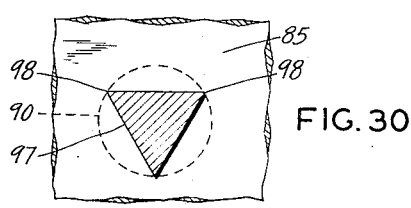
FIG. 30
*INVENTOR.*
LESTER F. MITCHELL
BY *Wallace and Cannon*
ATTORNEYS Patented Sept. 4, 1951

2,566,738

UNITED STATES PATENT OFFICE 2,566,738

PUNCHING APPARATUS

Lester F. Mitchell, Shaker Heights, Ohio, assignor to Addressograph-Multigraph Corporation, Wilmington, Del., a corporation of Delaware Application May 3, 1949, Serial No. 91,068

10 Claims. (Cl. 164—124)

This invention relates to punching apparatus, and particularly to a manually operable punch for producing data representing perforations in the data fields of printing and control devices.

Printing and control devices that embody printing means so that printed impressions may be made therefrom when the devices are passed through a suitable printing machine, are often utilized to carry control data or information that is afforded thereon by means of perforations placed at different data representing positions in data fields afforded on such printing devices. Usually these data representing perforations are formed in the printing and control devices by power operated punching means, but there are many instances where it is desirable to enable such perforations to be made manually. It is, therefore, an important object of the present invention to simplify the manual production of control or data representing perforations in printing and control devices, and a related object is to enable these data representing perforations to be formed in the data fields of such printing and control devices through the use of a simple and easily operated punching tool.

Printing and control devices that embody metal printing plates are customarily formed with a frame or carrier upon which the printing plate is removably mounted, and such printing and control devices also have one or more data fields thereon affording a relatively large number of index points that may be assigned different values or other data representing functions so that by forming perforations at selected of such index points, the desired information that is pertinent to the particular printing and control device may be mechanically represented thereon in such a form as to enable subsequent use to be made of such data representations in controlling the printing machine and other mechanisms that may be associated with the printing machine. As disclosed in the Walter T. Gollwitzer Patent No. 2,132,412, patented October 11, 1938, such data fields on the printing and control device may be formed with a perforation through the frame at each potential index or data representing point, and a control card is removably mounted on the frame in position over these data representing fields so that effective control perforations may be formed at any of the desired index points in alignment with the frame perforation that is afforded in the carrier or frame at such index point. It is a further and important object of the present invention to enable the form and relation of the elements of such printing and control devices to cooperate with manually operable punching means to simplify the punching operation, and insure the formation of accurately located control or data representing perforations in the control card of the printing and control device. More specifically, it is an object of the present invention to enable the pre-punched frame perforations at the respective index points of the data fields in such printing and control devices to cooperate with manually operable punching means to accurately guide the punching means in its operation while at the same time cooperating with the punching element to insure complete and proper severance of the material of the card in the course of the punching operation.

Other and more specific objects of the present invention are to enable a perforation to be formed in the control card of a printing and control device of the aforesaid character through a rapidly performed succession of different piercing, centering, and cutting or shearing operations all performed by the punching tool as the operating head thereof passes through the card of the printing and control device, and to form such a perforation by a manual tool that acts successively to pierce the card, to cooperate with the frame perforation in the frame to center the punching tool, and to thereafter trim the material by progressive trimming or shearing operations about the edge of the frame perforation in the printing device frame.

Other and further objects of the present invention will be apparent from the following description and claims and are illustrated in the accompanying drawings, which, by way of illustration, show a preferred embodiment and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claims.

Figure 5:
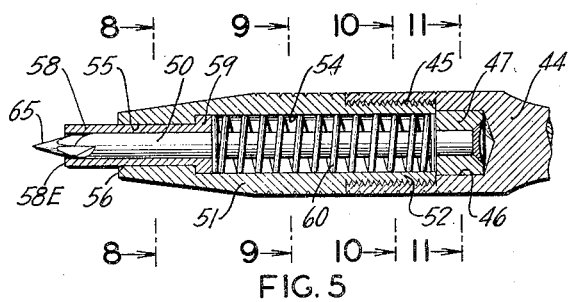
Fig. 5 is a longitudinal central sectional view of the punching end of the tool, the view being taken substantially along the line 5—5 of Fig. 3.
Figure 6:
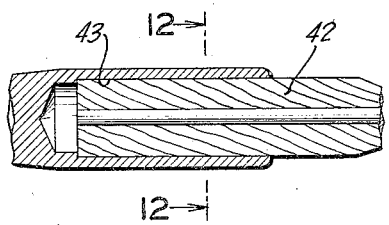
Fig. 6 is a similar longitudinal sectional view of the rear or marking end of the tool.
Figure 7:
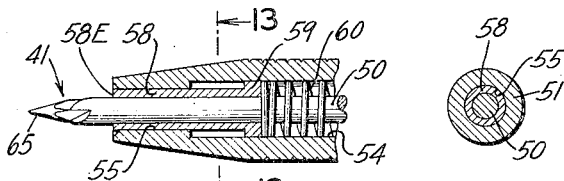
Fig. 7 is a view showing a portion of Fig. 5 and with the clamping and stripping sleeve in its retracted position.
Figure 8:
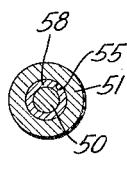
Figure 9:
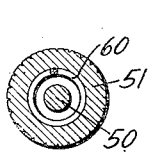
Figure 10:
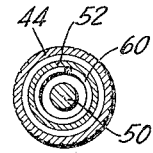
Figure 11:
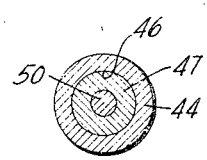
Figure 12:
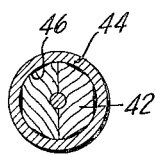
Figure 13:
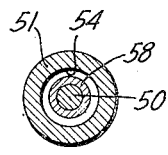
Figure 15:
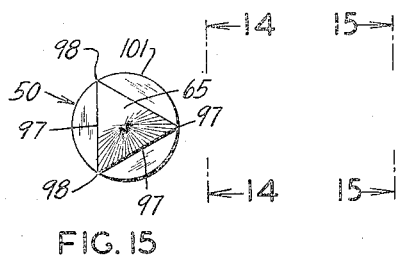
Figure 14:
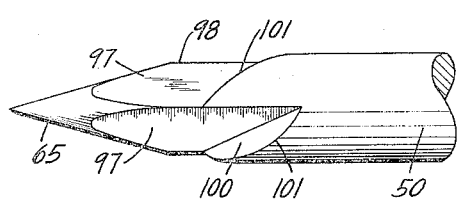
Figure 17:
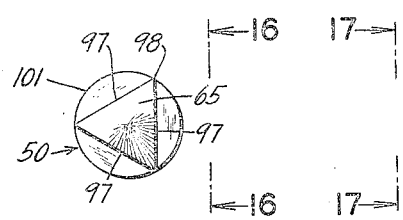
Figure 16:
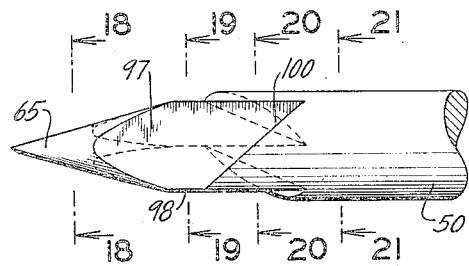
Figure 18:
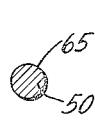
Figure 19:
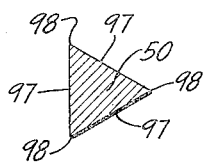
Figure 20:
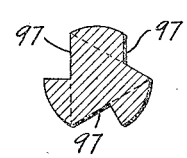
Figure 21:
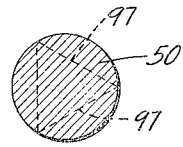
Figure 23:
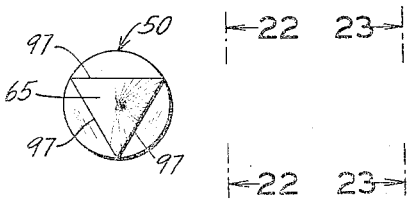
Figure 22:
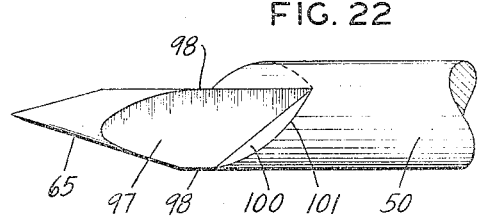

Figs. 8, 9, 10 and 11 are transverse sectional views taken substantially and respectively along the lines 8—8, 9—9, 10—10 and 11—11 of Fig. 5;

Fig. 12 is a transverse sectional view taken along the line 12—12 of Fig. 6;

Fig. 13 is a transverse sectional view taken substantially along the line 13—13 of Fig. 7;

Fig. 14 is an enlarged side elevational view of the punching element as viewed from line 14—14 of Fig. 15;

Fig. 15 is an end elevational view of the punching element as viewed from line 15—15 of Fig. 14;

Fig. 16 is a side elevational view of the punching element in a different rotative position and as viewed from the line 16—16 of Fig. 17;

Fig. 17 is an end elevational view of the punching element as viewed from the line 17—17 of Fig. 16;

Figs. 18, 19, 20 and 21 are transverse sectional views of the punching element taken substantially and respectively along the lines 18—18, 19—19, 20—20 and 21—21 of Fig. 16;

Fig. 22 is a view similar to Figs. 14 and 16 and showing the punching element in another rotative position, the view being taken substantially from line 22—22 of Fig. 23;

Fig. 23 is an end elevational view of the punch as viewed from line 23—23 of Fig. 22;

Fig. 24 is a front face view of a printing and control device of the general type with which the present punching tool may be effectually utilized;

Fig. 25 is an enlarged vertical sectional view taken substantially along the line 25—25 of Fig. 24;

Fig. 26 is a view illustrating the first step in the formation of a control perforation with the punching tool of the present invention;

Fig. 27 is a view similar to Fig. 26 and showing the relationship of the punching tool to the printing and control device when the punching operation has been partially completed;

Fig. 28 is a view similar to Figs. 26 and 27 and showing the relationship of the punching tool to the printing and control device upon completion of the punching operation;

Fig. 29 is a view showing the relationship of the punching tool to the printing and control device when the perforating portion of the operation has been partially completed;

Fig. 30 is a view taken substantially along the line 30—30 of Fig. 27 and showing the relationship of the parts after the punching operation has progressed from the relationship shown in Fig. 29 to the relationship shown in Fig. 27; and Fig. 31 is a view taken substantially along the line 31—31 of Fig. 28 and showing the relationship of the punch to the printing and control device at the completion of the punching operation.

Figure 1:
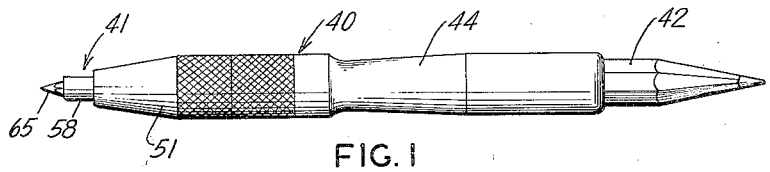
Fig. 1 is a side elevational view of a manual punching tool embodying the features of the invention.
Figures 2, 3:
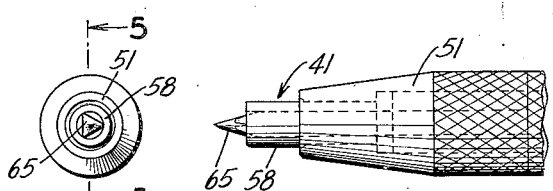
Fig. 2 is an enlarged fragmental side elevational view of the punching tool.
Fig. 3 is an end elevational view of the punching tool as viewed from the left in Fig. 2.
Figure 4:
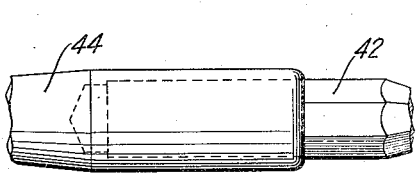
Fig. 4 is an enlarged side elevational view of the rear or right hand end of the tool shown in Fig. 1.

For purposes of disclosure, the invention is herein illustrated as embodied in a manual punching tool 40 that is of elongated form and which has a punching and stripping mechanism 41 at its forward end and which has a marking device such as a pencil 42 mounted in the other end by insertion in a socket 43 in such other or rear end of the punching tool. The punching tool is of an elongated form so that it may be grasped after the manner of a stylus for applying the desired positioning and operating movements thereto, and thus the tool is formed from an elongated body member 44 that has an internally threaded bore 45 at its left hand or forward end as viewed in Figs. 1, 2 and 5. At the bottom of this internally threaded bore 45, a counter bore 46 of somewhat smaller diameter is formed, and this counter bore 46 is utilized to receive a complemental head 47 that is fixed on the upper end of an elongated punch 50. After the punch 50 is put in place with the head 47 thereof disposed within the socket 46, a retaining barrel 51 is threaded into the internally threaded bore 45, the barrel 51 having a threaded nipple 52 thereon which extends into the threaded portion 45 and engages the adjacent peripheral or bordering edge of the head 47 so as to hold the head 47 and the attached punch 50 in position.

The barrel 51 has an elongated cylindrical chamber 54 formed therein which at its forward or left hand end opens through a reduced guiding bore 55, and the punch 50, of course, extends entirely through the barrel 51 and beyond the shouldered outer end 56 of the barrel. Within the reduced bore 55 and surrounding the punch 50 a pressure applying stripper sleeve 58 is mounted, and within the chamber 54 the stripper sleeve 58 has a flange 59 which limits outward movement of the stripper sleeve 58. The stripper sleeve 58 is yieldingly urged in an upward direction by means of a coil spring 60 disposed about the punch 50 within the chamber 54 and acting between the head 47 of the punch and the flange 59 of the stripper sleeve 58. In its outermost position the outer end 58E of the stripper sleeve 58 is disposed substantially rearwardly of a pointed piercing end 65 that is formed of conical shape on the forward or left hand end of the punch 50 as viewed in Fig. 5 of the drawings.

Under and in accordance with the present invention, the punch 50 is so formed as to facilitate the formation of data representing perforations in a printing and control device that may take the form of the printing and control device 70 that is shown in Figs. 24 to 28 of the drawings. The printing and control device 70 is generally similar to the printing and control device shown in the Walter T. Gollwitzer Patent No. 2,132,412, patented October 11, 1938, the printing device 70, however, being of a substantially larger size in the present instance to afford additional area in which data fields may be provided. Thus the printing and control device 70 embodies a sheet metal frame 71 of rectangular form and having a curled edge 72, retaining devices 73, and a pair of spring resilient retaining latches 74 whereby an embossable printing plate 75, carrying a name and address or the like in embossed type characters 76, may be removably retained on the frame 71. Along the other or opposite edge of the frame 71, a curled edge 77 is afforded for cooperation with retaining devices 78 to retain an index card 79, and this index card may be used to bear all or a part of the information carried by means of the type character 76 on the printing plate 75. Adjacent to the curled edge 77, the frame 71 is provided with a plurality of mounting sockets 80 in which identifying tabs may be inserted in accordance with usual practice, and in addition, a pair of sockets 81 are afforded so that pivotally mounted shift-tabs 84 may be mounted in these two sockets 81.

In the area between the printing plate 75 and the index card 79, a plurality of data fields are afforded, and these data fields are covered by control cards 85 and 86 that are held removably in place by means of retaining devices 87. In the data fields that are defined by the control cards 85 and 86, a relatively large number of index positions may be afforded, and as disclosed in the aforesaid Gollwitzer Patent No. 2,132,412, the frame 71 has a frame perforation 90 formed therein at each potential index point.

When the punching tool 40 of the present invention is to be utilized to form a control perforation such as the control perforation 91 of Fig. 24, the pointed end 65 is first engaged with the exposed face of the control card 85 opposite the frame perforation 90 that is disposed at the desired index point as shown in Fig. 26 of the drawings. It should be observed that control cards 85 have printed indicia thereon such as letters 94 or figures 95 at the several potential index points, so that these indicia afford a guide for determining the initial point at which the control card 85 is to be pierced. When the control card 85 is thus pierced by the pointed end 65 of the punch 50, the present invention provides for cooperation of the pointed end of the punch with the sides of the aligned frame perforation 90 to guide and center the punch 50, and this invention provides further for cooperation of the punch 50 with the sides of the frame perforation 90 to thereafter fully shear the material of the control card 85 to afford a neatly cut control perforation 91 of a diameter corresponding with the diameter of the frame perforation 90.

Thus, it will be observed that the punch 50 is of a cylindrical form throughout the major portion of its length, and the punch is of a diameter that is complemental to the diameter of the frame perforations 90. The conical pointed end 65 extends in its true conical form for a substantial distance as will be evident in Figs. 14, 16 and 22, and the punch 50 is then formed with a plurality of flat faces 97 that are parallel to the axis of the punch and are so spaced from and related to such axis that the several planes intersect to form a plurality of cutting edges 98 that are also parallel to the axis of the punch 50 and are located in the cylindrical surface of the punch. In the present instance, three flat faces 97 are afforded, and these flat faces, therefore, afford three cutting edges 98. It will be apparent that as the pointed end 65 is inserted through the control card 85, the conical surface thereof will cooperate with the frame perforation 90 to center the punch 50, and when the piercing operation has progressed to such a point that the three cutting edges 98 are engaged with the sides of the frame perforation 90, the punch 50 will be accurately centered in respect to such frame perforation and the material of the card, at the three points corresponding to the locations of the cutting edges 98, will have been cut radially to points located opposite the edge of the frame perforation 90. After the punch 50 has reached such a relationship, the punch is effective in continued downward or inward movement to effect progressive cutting or shearing operation through cooperation of the sides of the frame perforation 90 with means afforded on the punch 50. Thus, in affording such cooperating shearing means, the flat faces 97 are terminated at their upper ends in shoulders 100 that in each instance are perpendicular to the adjacent flat face 97 and are disposed at an acute angle with respect to the axis of the punch 50. The angular positions of the several shoulders 100 are the same so that three angular shearing edges are afforded at the intersections 101 of the shoulders 100 with the cylindrical surface of the punch 50.

Hence, after the punch 100 has been fully and accurately centered by engagement of all of the cutting edges 98 with the sides of the frame perforation 90, the continued inserting movement of the punch 50 causes the material of the card 85 that is opposite the frame perforation 90 to be sheared by the shearing edges 101 as they pass the adjacent edge of the side of the frame perforation 90. It will be evident, therefore, that when the punch 50 has been fully inserted to the position shown in Fig. 28 of the drawings, the desired control perforation 91 will have been formed by a neat and accurate shearing operation in alignment with the frame perforation 90.

In the progressive insertion of the punch 50 as hereinbefore described, the end 58E of the stripper sleeve 58 engages the card 85 so that the sleeve 58 will be disposed in the relationship shown in Fig. 28 at the end of the perforating operation. Then, as the punch 50 is withdrawn, the stripper sleeve 58 exerts a yielding pressure upon the card 85 until such time as the conical portion 65 of the punch has been retracted into the plane of the card 85, and thus the stripping action of the sleeve 58 avoids any possibility of tearing or displacement of the card 85 in removal of the punch 50.

After a perforation 91 has been formed, a suitable mark around or adjacent to the perforation 91 may be made merely by reversing the punching tool 40 and employing the marking device 42.

From the foregoing description it will be evident that the present invention materially simplifies the formation of data representing perforations in printing and control devices, and it will also be apparent that under the present invention, such results are obtained through the use of a manual punching tool that is extremely simple and economical in its construction and which is adapted to be readily and easily operated.

Thus, while I have illustrated and described the preferred embodiment of my invention, it is to be understood that this is capable of variation and modification, and I therefore do not wish to be limited to the precise details set forth, but desire to avail myself of such changes and alterations as fall within the purview of the following claims.

I claim:

1. In a hand operated punching tool for forming data representing perforations in a control card that is disposed on a printing and control device frame and has a frame perforation formed in such frame opposite each index point at which a data representing perforation may be desired in such control card, said punching tool comprising an elongated body adapted to be grasped in the manner of a stylus by the user and having an elongated axial chamber in one end thereof, an opening through said one end, an elongated punch of cylindrical form fixed within said chamber and extending axially beyond the open end of the chamber, said punch being formed to afford a conical pointed end for piercing a control card opposite a frame perforation, said punch being of a diameter complemental to the diameter of such frame perforations and being formed adjacent to said pointed end with three flat faces parallel to and equally spaced about the axis of said punch in positions to intersect in three edges located substantially in the cylindrical surface of said punch, and said flat surfaces at the ends thereof remote from said pointed end each being terminated in a shoulder disposed substantially perpendicular to the adjacent flat surface and at an acute angle to said axis to thereby intersect with said cylindrical surface and form a shearing edge for shearing cooperation with the edge of a frame perforation during progressive insertion of the punch through such a card and frame perforation.

2. In a hand operated punching tool for forming data representing perforations in a control card that is disposed on a printing and control device frame that has a frame perforation formed therein at each index point at which a data representing perforation may be desired in such control card, said punching tool comprising an elongated body adapted to be grasped in the manner of a stylus by the user and having an elongated axial chamber in one end thereof, an opening through said one end, an elongated punch of cylindrical form fixed within said chamber and extending axially beyond the open end of the chamber, said punch being formed to afford a conical pointed end for piercing a control card opposite a frame perforation, a stripper sleeve disposed partially within said chamber and extending slidably outwardly through said bore and about a part of said pointed end, spring means within said chamber urging said sleeve outwardly, said punch being of a diameter complemental to the diameter of such frame perforations and being formed adjacent to said pointed end with three flat faces parallel to and equally spaced about the axis of said punch in positions to intersect in three edges located substantially in the cylindrical surface of said punch, and said flat surfaces at the ends thereof remote from said pointed end each being terminated in a shoulder disposed substantially perpendicular to the adjacent flat surface and at an acute angle to said axis to thereby intersect with said cylindrical surface and form a shearing edge for shearing cooperation with the edge of a frame perforation during progressive insertion of the punch through such a card and frame perforation.

3. In a hand operated punching tool for forming data representing perforations in a control card that is disposed on a printing and control device frame that has a frame perforation formed therein at each index point at which a data representing perforation may be desired in such control card, said punching tool comprising a holder adapted to be grasped by the user, an elongated punch of cylindrical form fixed to said holder and projecting therefrom, said punch being formed to afford a conical pointed end for piercing a control card opposite a frame perforation, said punch being of a diameter complemental to the diameter of such frame perforations and being formed adjacent to said pointed end with three flat faces parallel to and equally spaced about the axis of said punch in positions to intersect in three edges located substantially in the cylindrical surface of said punch, and said flat surfaces at the ends thereof remote from said pointed end each being terminated in a shoulder disposed substantially perpendicular to the adjacent flat surface and at an acute angle to said axis to thereby intersect with said cylindrical surface and form a shearing edge for shearing cooperation with the edge of a frame perforation during progressive insertion of the punch through such a card and frame perforation, a stripper sleeve surrounding said punch, and means urging said sleeve forwardly along said punch to a normal position wherein said pointed end is partially enclosed but the extreme point thereof is exposed.

4. In a hand operated tool for forming data representing perforations in a control card that is disposed on a printing and control device frame that has a frame perforation formed therein at each index point at which a data representing perforation may be desired in such control card, said punching tool comprising a holder, an elongated punch of cylindrical form fixed to said holder, said punch being formed to afford a conical pointed end for piercing a control card opposite a frame perforation, said punch being of a diameter complemental to the diameter of such frame perforations and being formed adjacent to said pointed end with three flat faces parallel to and equally spaced about the axis of said punch in positions to intersect in three edges located substantially in the cylindrical surface of said punch, and said flat surfaces at the ends thereof remote from said pointed end each being terminated in a shoulder disposed substantially perpendicular to the adjacent flat surface and at an acute angle to said axis to thereby intersect with said cylindrical surface and form a shearing edge for shearing cooperation with the edge of a frame perforation during progressive insertion of the punch through such a card and frame perforation.

5. In a hand operated punching tool for forming data representing perforations in a control card that is disposed on a printing and control device frame that has a frame perforation formed therein at each index point at which a data representing perforation may be desired in such control card, said punching tool comprising a holder adapted to be grasped by the user, an elongated punch of cylindrical form fixed to said holder, said punch being formed to afford a conical pointed end for piercing a control card opposite a frame perforation, a stripper sleeve mounted on said holder about said punch and extending slidably about a part of said pointed end, spring means urging said sleeve along said punch toward said pointed end, said punch being of a diameter complemental to the diameter of such frame perforations and being formed adjacent to said pointed end with at least three flat faces parallel to and equally spaced about the axis of said punch in positions to intersect in cutting and guiding edges located substantially in the cylindrical surface of said punch, and said flat surfaces at the ends thereof remote from said pointed end each being terminated in a shoulder disposed substantially perpendicular to the adjacent flat surface and at an acute angle to said axis to thereby intersect with said cylindrical surface and form a shearing edge for shearing cooperation with the edge of a frame perforation during progressive insertion of the punch through such a card and frame perforation.

6. In a hand operated punching tool for forming data representing perforations in a control card that is disposed on a printing and control device frame and has a frame perforation formed in such frame opposite each index point at which a data representing perforation may be desired in such control card, said punching tool comprising an elongated body adapted to be grasped in the manner of a stylus by the user and having an elongated axial chamber in one end thereof opening through said one end, an elongated punch of cylindrical form fixed within said chamber and extending axially beyond the open end of the chamber, said punch being formed to afford a conical pointed end for piercing a control card opposite a frame perforation, said punch being of a diameter complemental to the diameter of such frame perforations and being formed adjacent to said pointed end with a plurality of flat faces parallel to and equally spaced about the axis of said punch in positions to intersect in cutting and guiding edges located substantially in the cylindrical surface of said punch, and said flat surfaces at the ends thereof remote from said pointed end each being terminated in a shoulder disposed substantially perpendicular to the adjacent flat surface and at an acute angle to said axis to thereby intersect with said cylindrical surface and form a shearing edge for shearing cooperation with the edge of a frame perforation during progressive insertion of the punch through such a card and frame perforation.

7. In a hand operated tool for forming data representing perforations in a control card that is disposed on a printing and control device frame that has a frame perforation formed therein at each index point at which a data representing perforation may be desired in such control card, said punching tool comprising a holder, an elongated punch of cylindrical form fixed to said holder, said punch being formed to afford a conical pointed end for piercing a control card opposite a frame perforation, said punch being of a diameter complemental to the diameter of such frame perforations and being formed adjacent to said pointed end with at least three flat faces parallel to and equally spaced about the axis of said punch in positions to intersect in a plurality of cutting and guiding edges located substantially in the cylindrical surface of said punch, and said flat surfaces at the ends thereof remote from said pointed end each being terminated in a shoulder disposed substantially perpendicular to the adjacent flat surface and at an acute angle to said axis to thereby intersect with said cylindrical surface and form a shearing edge for shearing cooperation with the edge of a frame perforation during progressive insertion of the punch through such a card and frame perforation.

8. In a hand operated punching tool for forming data representing perforations in a control card that is disposed on a printing and control device frame that has a frame perforation formed therein at each index point at which a data representing perforation may be desired in such control card, said punching tool comprising a holder adapted to be grasped by the user, an elongated punch of cylindrical form and of a diameter complemental to the diameter of such frame perforations, means securing one end of said punch rigidly to said holder, said punch being formed adjacent to its other end with three flat faces parallel to and equally spaced about the axis of said punch in positions to intersect in three edges located substantially in the cylindrical surface of said punch, and said flat surfaces at the ends thereof remote from said other end each being terminated in a shoulder disposed substantially perpendicular to the adjacent flat surface and at an acute angle to said axis to thereby intersect with said cylindrical surface and form a shearing edge for shearing cooperation with the edge of a frame perforation during progressive insertion of the punch through such a card and such a frame perforation, and said punch being formed between said flat faces and said other end to afford a piercing point for initial piercing of such a card, a stripper sleeve surrounding said punch, and means urging said sleeve forwardly along said punch to a normal position wherein said point is partially enclosed but the extreme point thereof is exposed.

9. An elongated punch of cylindrical form shaped to afford a conical pointed end for piercing a card or the like, said punch being formed adjacent to said pointed end with three flat faces parallel to and equally spaced about the axis of said punch in positions to intersect in three edges located substantially in the cylindrical surface of said punch, and said flat surfaces at the ends thereof remote from said pointed end each being terminated in a shoulder disposed substantially perpendicular to the adjacent flat surface and at an acute angle to said axis to thereby intersect with said cylindrical surface and form a shearing edge for shearing cooperation with the edge of a complemental perforation during progressive insertion of the punch through such a card or the like.

10. In a punch for use in a hand operated punching tool for forming data representing perforations in a control card that is disposed on a printing and control device frame that has a frame perforation formed therein at each index point at which a data representing perforation may be desired in such control card, said punch comprising an elongated body of cylindrical form shaped to afford a conical pointed end for piercing a control card opposite a frame perforation, said punch being of a diameter complemental to the diameter of such frame perforations and being formed adjacent to said pointed end with at least three flat faces parallel to and equally spaced about the axis of said punch in positions to intersect in cutting and guiding edges located substantially in the cylindrical surface of said punch, and said flat surfaces at the ends thereof remote from said pointed end each being terminated in a shoulder disposed substantially perpendicular to the adjacent flat surface and at an acute angle to said axis to thereby intersect with said cylindrical surface and form a shearing edge for shearing cooperation with the edge of a frame perforation during progressive insertion of the punch through such a card and frame perforation.

LESTER F. MITCHELL.

REFERENCES CITED

The following references are of record in the file of this patent:

UNITED STATES PATENTS

| Number | Name | Date |
| --- | --- | --- |
| 1,044,283 | Stanger | Nov. 12, 1912 |
| 1,723,935 | Henricson | Aug. 6, 1929 |